June 20, 1961 A. HEZEL ET AL 2,989,593

LINEFINDER CIRCUIT ARRANGEMENT

Filed Feb. 27, 1957

INVENTORS
A. HEZEL
W. WEISSER

BY Robert Harding Jr.
ATTORNEY 2,989,593
Patented June 20, 1961

2,989,593

LINEFINDER CIRCUIT ARRANGEMENT

Alois Hezel, Stuttgart-Weilimdorf, and Wolfgang Weisser, Stuttgart, Germany, assignors to International Standard Electric Corporation, New York, N.Y., a corporation of Delaware Filed Feb. 27, 1957, Ser. No. 642,857
Claims priority, application Germany Mar. 6, 1956
5 Claims. (Cl. 179—18)

Figure 1:
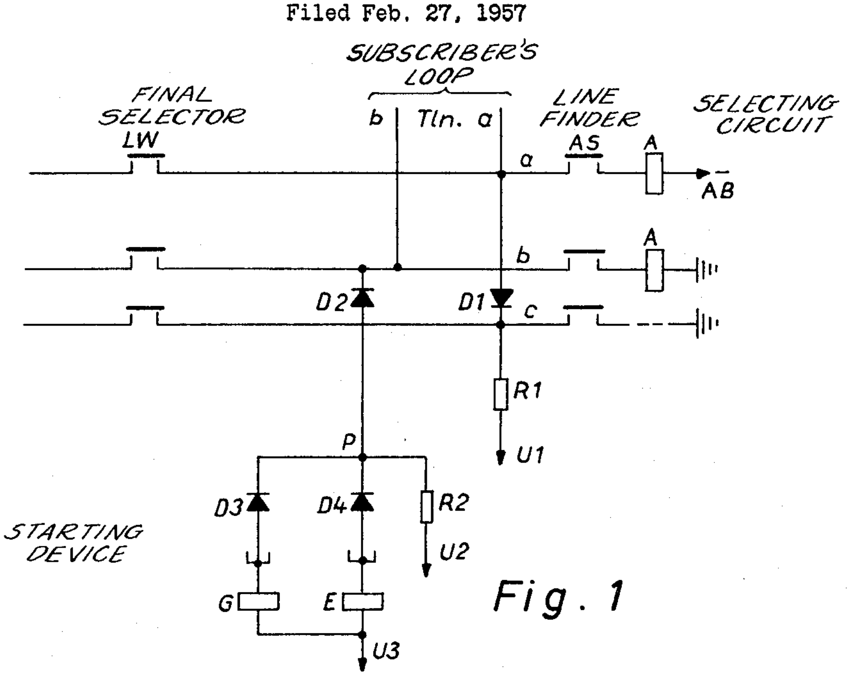

The present invention relates to a circuit arrangement for line finders without individual line relays. In this arrangement a starting device, particularly a marker, common to a plurality of subscribers' lines and connected so as to receive a portion of the voltage of the local battery, is connected to the circuit via nonlinear resistances parallelly associated with the subscriber lines, and these nonlinear resistances are blocked after connecting the line finders through.

A circuit arrangement is already known in which one of the electrodes of a rectifier is connected to either wire of each subscriber line. The other electrodes of these rectifiers are connected to a common starting relay connected so as to receive a portion of the voltage of the local battery. As soon as the line finder connects through the calling line and applies the full voltage of the local battery to the subscriber circuit, the rectifiers are blocked and the starting arrangement is released. Such an arrangement, however, has the disadvantage that regulating resistances have to be provided at the subscriber lines for correcting each individual subscriber line. By this means the direct current in each independent calling circuit does not exceed a predetermined value, since the line resistance drops to a point below a value corresponding to this current and renders the blocking of the rectifiers ineffective. A further disadvantage of said arrangement is that the individual insulating or leakage currents occurring at the common starting device for the various subscriber circuits are accumulated, thereby possibly causing wrong starting operations.

Furthermore there are other circuit arrangements known in which the common starting device is coupled in via resistances associated with the subscriber lines. In such an arrangement the resistances have a maximum allowable insulating or leakage current respectively. The disadvantage of said arrangement is that the number of the subscribers connected to the common starting device is limited and the insulating or leakage currents occurring at the starting device are not avoided.

The present invention avoids the aforementioned disadvantages by compensation of the insulating currents by means of a nonlinear resistance arranged at a subscriber line and a second nonlinear resistance arranged in series with leads to the starting device, and further by the application at their connection point of a voltage via an ohmic resistance which voltage is different from the voltage applied to the starting device.

The special advantage of the present invention is that the starting device can be adapted to any minimum insulating resistance. In case of the insulating resistance of the different subscriber loops dropping below a certain value, the insulating current is prevented by the compensation circuit influencing the starting circuit. By this means the number of subscriber circuits operating on a common starting device is not limited by the insulating current.

According to a further feature of the invention, starting an office call is possible for subscribers with different restrictions in P.A.B.X-systems in a very simple manner in which the ground, applied by a push button for consultation calls, does not work on the marking circuit.

Figure 2:
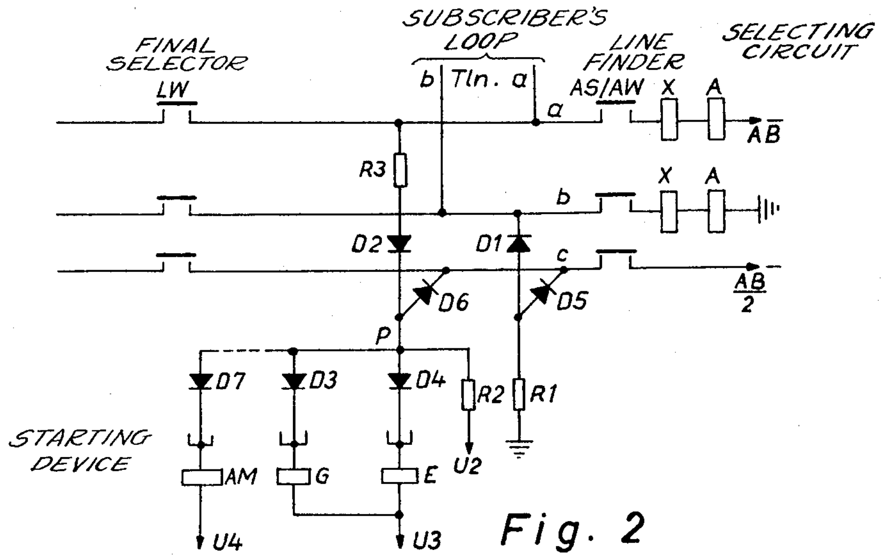

The above-mentioned and other features and objects of this invention and the manner of attaining them will become more apparent and the invention itself will be best understood by reference to the following description of an embodiment of the invention taken in conjunction with the accompanying drawings, in which:

FIG. 1 shows a relayless subscriber circuit for linefinders comprising nonlinear resistances along with a compensation circuit for the insulating or leakage currents of the different subscriber loops, and FIG. 2 shows an extended subscriber circuit for P.A.B.X-subscribers with provisions for starting internal and local calls.

FIG. 1 represents a combined starting and marking circuit including the relays G and E which is connected to the different subscriber lines via low-ohmic nonlinear resistances D2 and D4. The blocking of these resistances and thereby the disconnection of the starting and marking device from the subscriber loop T*ln* is effected when applying a connecting path by means of a linefinder (AS), which shifts the potentials on the *a*-, *b*-, and *c*-wires. Because of this compensation circuit the insulating current does not influence the starting circuit.

During the non-operative condition, when the subscribers' handsets are in position and the loops, such as T*ln* are therefore open, a certain current flows via each individual subscriber loop over the following circuit: U2, R2, D2, *b*-wire, insulation resistance, *a*-wire, D1, R1, U1.

The current occurring in this circuit is dependent on the insulation resistance.

Assuming for the circuit represented in FIG. 1 that a potential, for instance, for the local battery AB=−60 volts, U1=−60 volts, U2=−30 volts, and U3=−40 volts, the point P, for an insulation resistance up to 20,000 ohms, has a potential of −30 . . . −39 volts. With such a potential at P, the diodes D3 and D4 are blocked, so that the insulating current cannot influence the common marking means G and E. Thus the number of the subscriber circuits operating on a common starting device is not limited by the insulating current.

In the present embodiment, relays are used as marking means which can be replaced by other means, as for instance, electronic means. The starting device can be adjusted to any insulating resistance by means of resistance R2. In case of using an insulating resistance of relatively low value, correspondingly sensitive starting means should be applied. If, in an extreme case, the resistance R2 has a value of 0 ohm the subscriber is blocked in the outgoing direction.

When a subscriber lifts his handset and thereby closes his line loop T*ln*, the potential at point P rises negatively to about −50 volts, thus unblocking the diodes D3 and D4 and operating the relays G and E. These relays cause the operation of the linefinder AS and mark the calling subscriber's line at the same time in a manner not represented here. As soon as the linefinder AS, or, for incoming calls, the final selector LW, which in the exemplified embodiment are represented as selector switches, has connected through, −60 volts are applied to the *a*-wire via the feeding relay A, and ground potential to the *b*-wire, whereas the *c*-wire has ground potential via a low-ohmic resistance. By this means the diodes D1 and D2 get blocking potential, thus cutting off the subscriber loop T*ln* from the starting device and restoring the latter thereby to its normal position.

A blocking device (not shown) within the marking circuit prevents two subscribers being marked simultaneously.

FIG. 2 shows an extended subscriber circuit for P.A.B.X-systems provided with a starting circuit for internal and local calls. This system uses ground potential which is effected by a subscriber's push-button (not shown) as a signal for starting local calls.

In the diagram, the circuit elements corresponding to similar elements of FIG. 1 are marked by the same reference characters. In this embodiment the following voltages are chosen: AB=−60 volts, U2=−30 volts, U3=−20 volts, and U4=−10 volts.

Contrary to the circuit of FIG. 1, the starting and marking circuit is here applied to the *a*-wire. When the line-finder or the final selector has connected through, the *c*-wire is given a medium voltage potential (low ohmic) of the local battery, i.e. −30 volts, thus the diodes D1 and D2 have blocking potential via the diodes D5 and D6.

In starting an internal call, i.e. if the subscriber closes the line loop by lifting his handset, the marking relays G and E are operated in the following circuit: ground, R1, D1, *b*-wire, subscriber's loop, *a*-wire, $$\mathrm{R3,\ D2,\ \frac{D3,\ G}{D4,\ E},\ U3}$$

In this case a potential of −11 . . . −15 volts occurs at point P. Thereby the diode D7 remains blocked and the marking relay AM provided for starting local calls cannot operate.

When, because of a starting process, caused by push-button pressure at an unrestricted subscriber's station, a current extends from ground, *a*-wire, R3, D2, D7, AM to U4, the potential at point P drops negatively to about −5 . . . −9 volts, thereby operating the relay AM which marks this starting process as a local call.

The push button pressure for consultation calls which can only occur when the line finder AS/AW is connected, is ineffective, since this produces −30 volts at point P, whereby the diodes D3, D4, and D7 remain blocked.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A linefinder circuit arrangement having no line relay comprising a plurality of lines, a selecting circuit, a linefinder for selectively connecting said lines to said selecting circuit, a starting device common to said lines, means including series connected first and second nonlinear resistors for each line for connecting said line to one side of said starting device, said non-linear resistors being poled in the same direction, means responsive to a signal on a line for causing current to flow through said connecting means to operate said starting device, means responsive to connection of a line to said selecting circuit by said linefinder for blocking said nonlinear resistors to isolate said starting device from said line, and means connected to the point of intersection of said nonlinear resistors for permitting current to flow through said starting device only when said signal is greater than a predetermined value.

2. A linefinder circuit arrangement, as defined in claim 1, in which each line has two talking conductors and a test conductor and the first and second nonlinear resistors are connected to one talking conductor, and in which the means for causing current flow through the starting device comprises a third nonlinear resistor at each line connected between the other talking conductor and the test conductor, a first source of potential connected to the side of said starting device opposite to that on which the first and second nonlinear resistors are connected, and a second source of potential at each line having a different value of potential from that of said first source connected to said test conductor, and in which the means for blocking the nonlinear resistors comprises means for applying different potentials to the conductors of a line when the linefinder selects said line.

3. A linefinder circuit arrangement, as defined in claim 2, in which the means connected to the point of intersection of the first and second nonlinear resistors for permitting current to flow through the starting device comprises a resistor connected to said point of intersection and a third source of potential connected to said resistor, the potential of said source having a value outside of the range defined by the first and second sources.

4. A linefinder circuit arrangement, as defined in claim 1, further comprising an additional nonlinear resistor connected to the point of intersection of the first and second nonlinear resistors, an additional load device connected to said additional nonlinear resistor, and means for making said load device responsive to a signal from a line greater than the first mentioned signal therefrom, whereby the circuit arrangement may be made to serve lines having different restrictions.

5. A linefinder circuit arrangement having no line relay comprising a plurality of lines, each having at least two conductors, a selecting circuit, a linefinder for selectively connecting said lines to said selecting circuit, a starting device common to said lines having two terminals, a source of different potentials, means for connecting a first potential from said source to one terminal of said starting device, means at each line including first and second nonlinear resistors connected in series between the other terminal of said starting device and one conductor of said line, said non-linear resistors being poled in the same direction, a third nonlinear resistor at each line having one end connected to the other talking conductor of said line, means including a first resistor for connecting a second potential from said source to the other end of said third nonlinear resistor, said second potential being different from said first potential, said first and second potentials being such that when the wires of a line are connected together, as when a call is originated, current will flow through said nonlinear resistors and said starting device to operate said starting device, means responsive to the connection of said linefinder to a line for blocking the first, second, and third nonlinear resistors connected to said line, whereby said starting device is isolated from said line, a second resistor, and means for connecting said second resistor between a third potential from said source and the junction of said first and second nonlinear resistors, said third potential being different from said first and second potentials and being such as to permit current to flow through said starting device only when the resistance between the conductors of a line is below a predetermined value.

References Cited in the file of this patent

UNITED STATES PATENTS

| | | |
|---|---|---|
| 2,152,889 | Jedrychowski | Apr. 4, 1939 |
| 2,697,750 | Buchner et al. | Dec. 21, 1954 |